March 25, 1941.   G. E. M. PERROUX   2,235,815
RADIO GUIDING SYSTEM
Filed Sept. 22, 1938

INVENTOR
G.E.M. Perroux
BY
ATTORNEY

Patented Mar. 25, 1941

2,235,815

UNITED STATES PATENT OFFICE 2,235,815

RADIO GUIDING SYSTEM

Georges Edme Marcel Perroux, Paris, France, assignor to International Standard Electric Corporation, New York, N. Y.

Application September 22, 1938, Serial No. 231,187
In France October 6, 1937

5 Claims. (Cl. 250—11)

The present invention relates to systems utilising radio-electric energy in order to give to one or more moving vehicles indications which are useful for navigation purposes.

In known cases of the kind referred to the indications transmitted concern the angular position in relation to a key direction, the altitude, or the horizontal distance in relation to a base.

Known methods for indicating the distance consist of utilising small directional transmitters called beacons. The number of the beacons is in general limited to two, so that the indication of distance is limited to two numerical values. Between these two numerical values the distance is indeterminate.

The object of the present invention is particularly to furnish means of remedying this latter disadvantage. In order to attain this object the invention provides, according to one of its aspects, a system of radio-guiding comprising a transmitter which produces a radiation, one or more characteristics of which vary continuously as a variable dependent of at least one of the co-ordinates which it is desired to give to the moving vehicle which is being guided, the latter being provided with a receiver which is adapted to measure the variations of the said characteristic. The said characteristic of radiation can moreover be chosen so that it is substantially independent of the fluctuations, for example of supply of the transmitter system, or should this condition be difficult to satisfy, the receiver system should be provided with means of correcting the characteristic chosen so as to compensate said fluctuations.

According to another feature of the invention, instead of utilising a single transmission characteristic, two characteristics are used, and the receiving apparatus is arranged so as to be sensitive to their quotient, whereby certain interfering fluctuations of the transmitter are eliminated.

According to another feature of the invention, a plurality of transmitter systems are provided the radiations from which alternate so as to produce a resulting radiation possessing a characteristic suitable for the desired object.

Another feature of the invention consists of regulating the alternation of the radiations transmitted so that an indicating apparatus, for example of the type with moving coil in a fixed magnetic field, is sensitive to their resultant.

According to a feature of the invention, the characteristic of the radiation consists in the percentage of modulation of such radiation.

Other equally important features of the present invention will appear in reading the following description of examples of practical embodiments given in connection with the attached drawing, in which—

Figure 1:
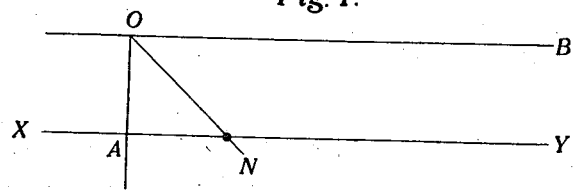
Fig. 1 represents schematically a diagram in the case of the measurement of the distance of a moving vehicle to a given point.

In Fig. 1 it is supposed that the moving vehicle is guided by known means according to a trajectory XY. The point of arrival being at A and N being the point of location of the vehicle, according to one aspect of the invention, the quadrant OAB is marked out by a characteristic of the radiation of a transmitter O, the said characteristic varying as the angle AON and the moving vehicle is provided with means for appreciating this characteristic. The angle AON is therefore known and, consequently, its distance AN which equals OA tangent AON. The indicating apparatus of the moving body can therefore be graduated directly in distances equal to AN if the distance OA is known for example 500 meters.

If the invention is applied to aerial navigation, the chosen characteristic of the radiation of the transmitter O which is employed is independent of the altitude of the airplane, within the limits of practical utilisation.

In accordance with a feature of the invention the transmitter O and its radiating system are disposed so as to produce a radiation the percentage of modulation of which varies as a dependent variable of the azimuth. For example, the percentage modulation will be nil in the direction OA and maximum in the direction OB.

The mobile receiver is provided with an apparatus which measures this percentage modulation and consequently the angle AON and the dial of the indicator can therefore be graduated directly in distances AN.

Figure 2:
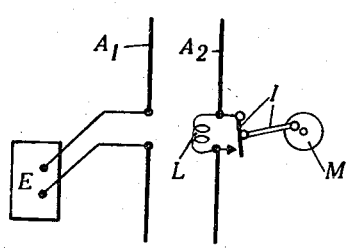
Fig. 2 represents an example of an aerial system suitable for use in one embodiment of the invention.

A practical form of aerial for the transmitter O is represented by the Figure 2. An antenna $A_1$ is fed by the transmitter E with unmodulated continuous waves. At a distance of a quarter wave from the antenna $A_1$ is disposed an unfed auxiliary conductor $A_2$. An inductance-coil L is introduced in the middle of the conductor $A_2$ and the electric length is regulated so that $A_2$ acts as a reflector. The inductance-coil L can be short-circuited by a cut-out I operated by a motor M. When the coil L is short-circuited, the electric length of $A_2$ is such that $A_2$ acts with respect to $A_1$ as a director.

Figure 3:
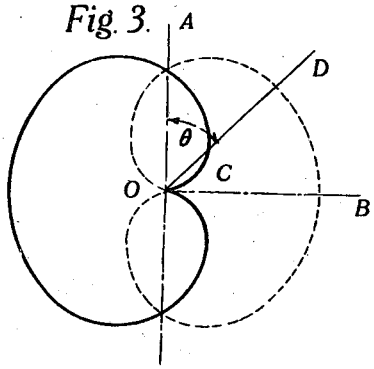
Fig. 3 represents a radiation diagram of the aerial system shown in Fig. 2.

In Fig. 3 is represented in continuous line the diagram of radiation obtained when the inductance-coil L is in service and the aerial $A_2$ functions as a reflector, and in broken lines the diagram corresponding to the case where the inductance-coil is short-circuited and $A_2$ functions as director. The cut-out I is manipulated at audible frequency by the motor M. A receiver placed in the direction OCD (Fig. 3) therefore receives alternately fields OC or OD, that is to say a percentage of modulation equal to:

$$a = \frac{OD - OC}{OD + OC}$$

It can be seen that the percentage of modulation is nil in the direction OA and maximum in the direction OB.

If the radiation diagrams are cardioids, the fields OD and OC have the values:

$$OD = E_0(1 + \sin \theta)$$
$$OC = E_0(1 - \sin \theta)$$

the percentage of modulation is: $a = \sin \theta$.

Figure 4:
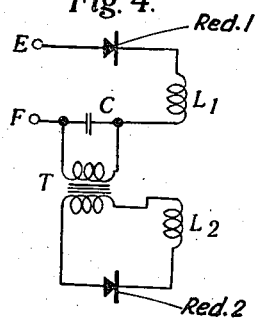
Fig. 4 represents a receiver system suitable for use in conjunction with the aerial system shown in Fig. 2.

The receiving apparatus is schematically represented by Figure 4. The high frequency currents, after amplification, are applied to the terminals E, F. A first detector $Red_1$ supplies one of the windings $L_1$ of the indicating apparatus. Through $L_1$ there flows a rectified modulated current and its average field is proportional to the mean value of the current, that is to say to half the sum of $OD+OC$ (Fig. 3). The low frequency component of this rectified modulated current is collected by the transformer T, the high frequency components being by-passed by condenser C, and this low frequency component is applied to the second winding $L_2$ of the indicator after rectification by the rectifier $Red_2$. The field of $L_2$ is proportional to half the alternating amplitude $OD - OC$ (Fig. 3). If the indicating apparatus is of the quotient-meter type, the position of the mobile equipment is determined by the relation of the currents passing through the windings $L_1$, $L_2$ and consequently to the percentage of modulation of the signal applied. The position of the mobile equipment varies as the angle AON of Fig. 1, and therefore it is possible to graduate the indicator dial direct in distances AN if the base OA is fixed.

By suitably shaping the pole pieces of the indicating apparatus, it is moreover possible to choose a suitable law of deviation so that the distance scale is easy to read.

The device described above by way of a non-limitative example embodying the invention presents special features which constitute advantages of the invention, namely (1) The relative sensitivity and precision of the device increase when the moving vehicle draws nearer to its point of arrival, (2) The indication of distance is independent of the absolute value of the field radiated by the transmitter, that is to say, independent of the variations of the sources of supply or other causes affecting the power of the transmitter. It is therefore possible to provide the receiver with an automatic gain controlling device or other sufficient time constant limiter to prevent saturation when the moving vehicle draws nearer the transmitter and to use sensitive receivers permitting great range.

Figure 5:
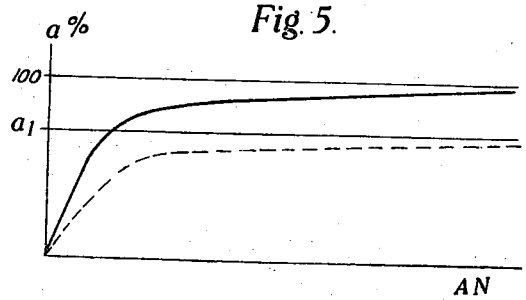
Fig. 5 represents curves of variation of the percentage modulation plotted against the distance from the transmitter of the moving guided vehicle.

(3) In Fig. 5 is represented the variation of the percentage of modulation $a$ in terms of the distance AN. The curve in continuous lines corresponds to the ideal case where the maximum percentage reaches 100 per cent. If, as the result of a defective adjustment of the transmitter, the maximum percentage reaches another value smaller than $a_1$, the variation of $a$ in terms of the distance is represented by the curve in broken lines. It can be seen that the point of arrival is unchanged and that the error in distance involved by the bad adjustment of the transmitter becomes less than less when the distance decreases.

The practical results are therefore, in a certain measure, independent of the exact adjustment of the transmitter diagrams.

Figure 6:
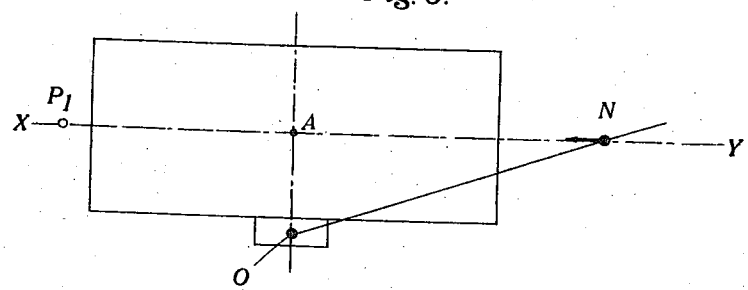
Fig. 6 represents the lay-out of an air-craft landing field utilising radio-guiding means according to the present invention.

Fig. 6 shows as an example of a practical application, the arrangement of an air landing field employing features of the present invention. $P_1$ represents a radio-beacon "beaconing" the landing direction XY and giving the altitude indications according to known methods. At O is situated the radio-beacon having features according to the present invention, and the direction of zero modulation of which is directed towards the point A in the centre of the field.

An airplane N intending to land on the field receives its direction and altitude indications coming from the radio-beacon $P_1$ and its distance signals from the radio-beacon O, and this latter can moreover be situated in proximity to the airport buildings, that is to say under the best conditions for maintenance, supply and inspection.

(4) In the case of guiding hydroplanes during their alighting the known devices would require the installation of the beacons in the open sea and thus encounter enormous practical difficulties. The present invention enables the transmitters (direction, altitude), and the distance radio-beacon forming the object of the present invention to be installed on land.

What is claimed is:

1. Method of guiding a vehicle by radio which comprises transmitting from an antenna system a directive radiation, alternating the direction of the pattern of said radiation between two fixed directions at a predetermined frequency, receiving said radiation on said vehicle, employing the resultant of the received alternate radiations for measuring the percentage modulation produced by the alternate fields, and utilising the said measured modulation to give an indication of the value of a coordinate of the position of said vehicle.

2. A system of apparatus for the radio guiding of vehicles, comprising a transmission system arranged to provide a radiation diagram of a predetermined form, means for alternating the pattern of said diagram in different directions at a predetermined frequency, means on the moving vehicle for determining the percentage of modulation due to the alternations of the radiation field and an indicator responsive to said percentage modulation for indicating the distance of said vehicle from said transmission system.

3. A system of apparatus for the radio guiding of vehicles, comprising a transmission system arranged to provide a radiation diagram of predetermined form, means for alternating the pattern of said diagram in different directions, and an instrument on the moving vehicle for determining the percentage modulation of the two alternations of the field and means responsive to the determined percentage modulation for indicating the distance of said vehicle with respect to said transmission system.

4. A system of apparatus according to claim 3, in which the said instrument comprises two coils, means for rectifying the signals received from the transmitting station, means for applying said rectified signals to one of the said coils, so that the effect in the said coil is proportional to the sum of the signal currents, means for applying the rectified signals through a transformer to a second rectifier, and the doubly rectified signals to the second of said coils, so that the signal current fed to said second coil is proportional to the difference between the signal currents due to the two alternations of field, the said two coils being arranged to indicate the quotient of the currents flowing therethrough.

5. A system of apparatus for radio guiding of vehicles comprising a dipole antenna, a second dipole antenna situated from said first antenna by one quarter of a working wave length, an inductance coil connected in series with and between the two members of the second dipole, means for alternately short circuiting the said inductance coil at a predetermined frequency, means for energising the said first dipole antenna, a receiving apparatus on a moving vehicle means to measure the variation in the modulation of the field due to the alternations produced by alternately short-circuiting and open-circuiting said inductance coil and means to utilise said measured variation to indicate the distance represented thereby from a reference line.

GEORGES EDME MARCEL PERROUX.